H. E. SHEDD.
CALENDAR.
APPLICATION FILED MAY 28, 1918.
1,291,194.
Patented Jan. 14, 1919.
2 SHEETS—SHEET 2.
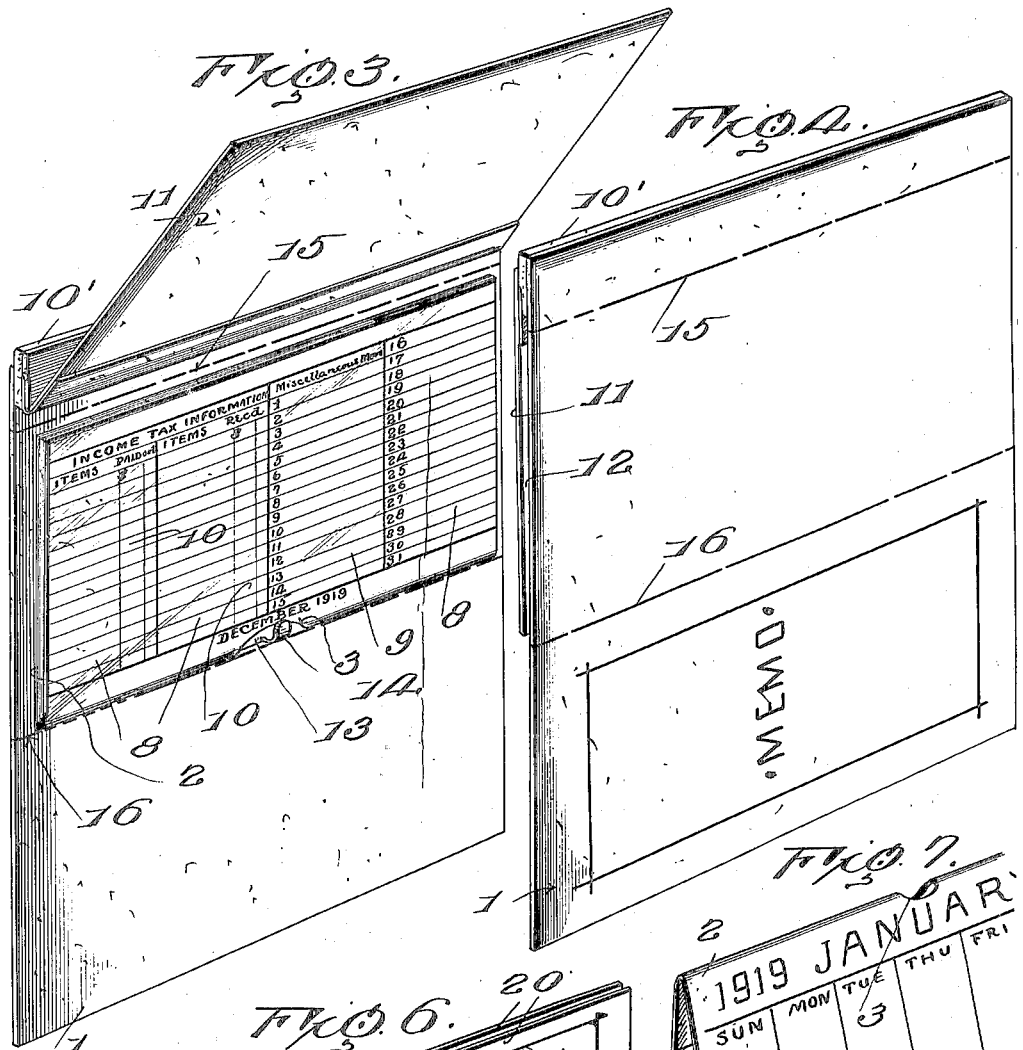
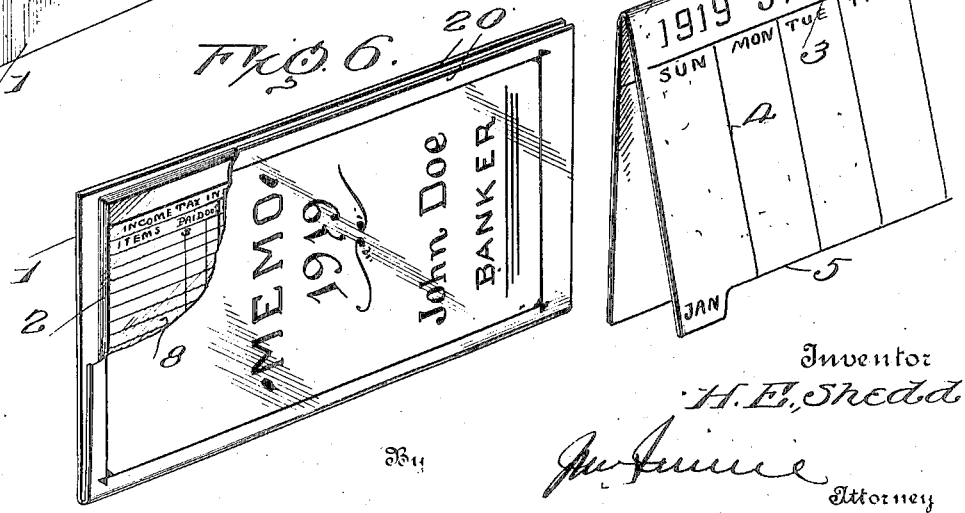
Inventor
H. E. Shedd

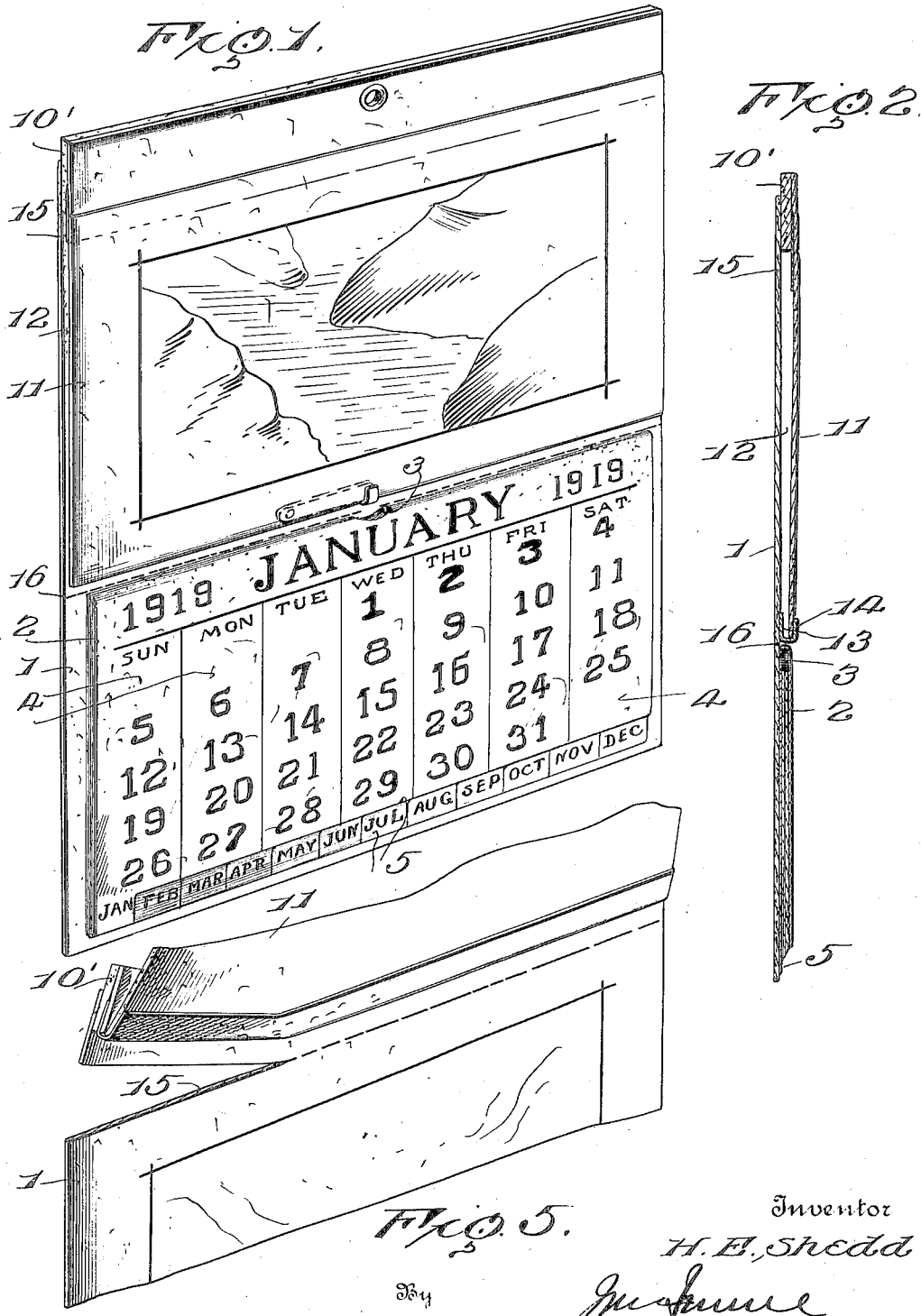

UNITED STATES PATENT OFFICE.

HUGH E. SHEDD, OF MINNEAPOLIS, MINNESOTA.

CALENDAR.

1,291,194.　　　　Specification of Letters Patent.　　Patented Jan. 14, 1919.

Application filed May 28, 1918.　Serial No. 237,016.

*To all whom it may concern:*

Be it known that I, HUGH E. SHEDD, a citizen of the United States of America, residing at Minneapolis, in the county of Hennepin and State of Minnesota, have invented certain new and useful Improvements in Calendars, of which the following is a specification.

My invention relates to improvements in calendars.

The object of the invention is to provide a calendar with a plurality of leaves, on one surface of which appears the date, month, et cetera, and on the opposite surface appears appropriate lines and spaces for memoranda, the leaves being arranged to be turned over, and provision being made to cover the leaves and retain them in consecutive order for future reference.

A further object of the invention is to provide a calendar of such construction that when its usefulness as a calendar has terminated, it can be folded to form a book to preserve the memoranda for future reference.

Another object of the invention is the provision of specific means for retaining the used leaves in a pocket provided to receive them.

The invention also comprehends improvements in the details of construction and arrangement of parts, which will be hereinafter described and particularly pointed out in the claims.

In the drawings, Figure 1 is a perspective view of my improved calendar. Fig. 2 is a central vertical section of same. Fig. 3 is a view similar to Fig. 1, but showing all the leaves turned up, and the retaining cover in open position. Fig. 4 is a perspective view looking from the rear of the calendar. Fig. 5 is a detail perspective view illustrating the manner of converting the structure from a calendar to a reference book. Fig. 6 is a perspective view of the improvement when converted into a reference book. Fig. 7 is a detail perspective view of one of the sheets which form the leaves.

1 indicates a base, and about midway of its length is hinged a series of leaves or sheets 2, each provided centrally with a notch 3. The front surface of each leaf is divided into vertical columns, indicated at 4, and at the top of the columns is printed in successive order the days of the week, and in the columns are the dates. Above the columns on each leaf is printed the month, on each side of same is the year. The bottom of each leaf is cut away, as at 5, the cut of each succeeding leaf is cut further from the preceding leaf to expose a portion of all the leaves when they are in normal position and on the exposed portions are the names of the months of the year.

On the back of each leaf is printed several vertical lines to form main columns 8, and crossing the vertical lines are horizontal lines to form main horizontal spaces 9. The first two vertical columns are subdivided to form subcolumns 10, for dollar and cent memoranda, and above one subcolumn are the words "Paid out," and adjacent same in the center of the main vertical column is the word "Items." Above the second subcolumn is the word "Received" and adjacent same in the center of the main vertical column is the word "Items." Above the first two main columns are the words "Income tax information."

The second and third main vertical columns are numbered consecutively from 1 to 31, to correspond to the days in a month, and over these figures are the words "Miscellaneous memo." At the bottom of the printed columns and spaces is the name of the month of the year.

The leaves are hinged to permit them to be turned up and out of the way after a month has expired, the columns and spaces affording a convenient arrangement for accommodating memoranda for any particular month after the data on the front side has lost its usefulness as a calendar. Across the top of the front of the base 1 is a transverse strip 10', and hinged thereto is a cover 11, its outer surface being substantially flush with the outer surface of the strip. The cover is thinner than the transverse strip, which forms a pocket 12, to receive the leaves when they are turned up.

To hold the cover and the used leaves in locked position in the pocket, a latch 13, is provided. The latch is pivoted to the front of the base 1, behind the cover, and has one end bent up to provide a lip 14, so positioned as to engage the lower edge of the cover and hold it in locked closed position. The lip is disposed so as to extend through the notches 3 in the leaves, to avoid tearing and to permit of concealment of the main portion of the latch.

The base 1 is provided with a score line 15, at a point just below the lower edge of the transverse strip. The base 1 is further provided with a second score line 16, arranged on a line with the hinge connection of the leaves, or about mid-way between the lower edge of the base and the upper score line 15.

When in use, the front of the cover, and the front of the base below the cover will be decorated with suitable ornamentations or with advertising matter. The rear of the base below the score line 16, will be provided with suitable advertising matter, as indicated in Figs. 4 and 6.

As the months go by the cover is released and the leaves are turned up and then the cover is lowered and locked. The cover can be conveniently released and turned up to expose the surface of the sheet or sheets in the pocket when it is desired to make a memorandum in any of the columns or spaces. The data for any particular month can be conveniently retained for future use, as the leaves are not destroyed after they have served their purpose as a calendar.

The leaves are formed by printing the data for two months on opposite ends of the opposite sides of a single sheet of paper, the sheet being folded in the middle. When all the sheets are thus printed and folded, a plurality of hinged leaves is formed somewhat after the fashion of a book. In this way the construction is simplified, and the leaves are not liable to be torn when folded up.

When the year for which a calendar is made up is past, it is desirable that the data on the reverse side of the leaves be preserved. To make this convenient, and at the same time afford means for protecting the leaves, the score lines are provided. For instance, the transverse strips and the cover are torn from the base on the score line 15, (as shown in Fig. 5) and then the base is folded upon itself on the second score line 16, as shown in Fig. 6, the opposite end portions of the base forming a cover 20 for the leaves, as best seen in Fig. 6. By this means the structure performs dual functions, that of a calendar, and a memorandum book.

It is evident that the tabulated data can be retained from year to year to make comparison for checking up purposes.

The invention is simple and inexpensive, and it is of such nature as to make it convenient to keep records and at the same time produce a simple calendar.

What I claim is:

1. A calendar comprising a base, a transverse strip at the top of the base, a cover hinged near the outer edge of the strip to form a pocket, a plurality of hinged leaves mounted on the base below the edge of the cover, each leaf having a notch, and a latch to engage the lower edge of the cover to retain the leaves in the pocket when turned up, said latch extending through the notches.

2. A calendar comprising a base provided near its upper end with a score line and substantially mid-way of its length with a second score line, a cover hinged to the front of the base above the upper score line, a plurality of leaves hinged to the front of the base, the hinge being approximately in line with the second mentioned score line and means for securing the cover to retain the leaves in place when turned up on the hinge, the score lines permitting of the cover being torn off, and the base folded to provide a closure for the leaves.

3. A calendar comprising a base, a plurality of leaves hinged to the base, means for holding the used leaves up on the base to expose the next succeeding leaf to view, said base having means to permit of it being folded to form side covers for the leaves.

4. A calendar comprising a base a plurality of hinged leaves on the base, the base having an indicating line adjacent the hinge of the leaves, whereby the base can be folded to form a cover to inclose the leaves.

5. A calendar comprising a base provided with horizontal indications on which said base is to be folded and torn, a transverse strip at or about the upper end of the base, a cover hinged to the strip, a plurality of leaves hinged to the base adjacent one of the horizontal indications, said leaves when turned up being inclosed in the space formed by the base, the strip and the cover, and means for holding the cover in locked position, the cover when the calendar year is over being torn off at one of the horizontal indications and the base being bent at the other horizontal indication to form a cover for the leaves.

6. A calendar comprising a base, and a plurality of leaves formed of a plurality of sheets folded intermediate their length and having the data for two months printed on opposite sides of opposite ends, and a cover hinged above the leaves to inclose same when folded up.

7. A calendar comprising a base, a plurality of sheets nested together and folded intermediate their length to form a hinge connection, and means extending through all the sheets where same are folded to fasten the sheets to the base.

In testimony whereof I affix my signature.

HUGH E. SHEDD.